(12) United States Patent
Orihashi et al.

(10) Patent No.: US 8,303,014 B2
(45) Date of Patent: Nov. 6, 2012

(54) PICK-UP STYLE UTILITY VEHICLE WITH EXPANDABLE CARGO BED

(75) Inventors: Yoshihiko Orihashi, Akashi (JP); Yohei Sasaki, Akashi (JP); Naohisa Masuda, Kobe (JP); Yoshihiro Watanabe, Kakogawa (JP); Hirokazu Morita, Kakogawa (JP); Koji Nozaki, Miki (JP); Masahiro Kawahara, Kobe (JP); Masashi Sakata, Kobe (JP); Takafumi Hisamori, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 168 days.

(21) Appl. No.: 12/649,814

(22) Filed: Dec. 30, 2009

(65) Prior Publication Data

US 2011/0156424 A1 Jun. 30, 2011

(51) Int. Cl.
*B62D 33/08* (2006.01)
*B60N 2/02* (2006.01)
*B60R 99/00* (2009.01)

(52) U.S. Cl. ............. 296/26.1; 296/65.01; 160/368.1
(58) Field of Classification Search ............ 296/24.4, 296/26.1, 65.01, 24.43, 26.08, 26.11, 186.4, 296/190.11, 69; 160/368.1
See application file for complete search history.

(56) References Cited

U.S. PATENT DOCUMENTS

| | | | | |
|---|---|---|---|---|
| 3,169,792 A * | 2/1965 | Viquez | | 296/99.1 |
| 6,478,355 B1 * | 11/2002 | Van Eden et al. | | 296/37.6 |
| 6,547,298 B2 * | 4/2003 | Sotiroff et al. | | 296/24.43 |
| 6,899,367 B1 * | 5/2005 | Plavetich et al. | | 296/65.13 |
| 6,905,159 B1 | 6/2005 | Saito et al. | | |
| 6,951,359 B2 * | 10/2005 | Swift | | 296/64 |
| 6,994,388 B2 | 2/2006 | Saito et al. | | |
| 7,093,871 B2 * | 8/2006 | Lim et al. | | 296/26.08 |
| 7,140,656 B2 * | 11/2006 | Allgayer et al. | | 296/24.43 |
| 7,249,798 B2 | 7/2007 | Saito et al. | | |
| 2007/0273192 A1 * | 11/2007 | Van Druff et al. | | 297/339 |

* cited by examiner

*Primary Examiner* — Glenn Dayoan
*Assistant Examiner* — Sunsurraye Westbrook
(74) *Attorney, Agent, or Firm* — Wenderoth, Lind & Ponack, LLP

(57) ABSTRACT

A pick-up style utility vehicle having a front seat, a rear seat, a cargo bed, a cabin frame surrounding a riding space, and a screen shield partitioning the cargo bed and a rear riding space in front of the cargo bed. The cargo bed can be changed between an expanded state in which the cargo bed is expanded in a front direction into the rear riding space and a non-expanded state not occupying the rear riding space. A backrest for the rear seat is attached to the screen shield. The screen shield can be shifted between a position in the expanded state and a position in the non-expanded state when a seat bottom and the backrest of the rear seat are changed between a retracted state in which the seat bottom and the backrest are erected on the same straight line and a seatable used state.

10 Claims, 14 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

Typically, a screen shield is provided at the front end of the cargo bed of the pick-up style utility vehicle so as not to move a load loaded on the cargo bed into the riding space in front of the cargo bed. The screen shield need be changed between the 2 passengers transformation expanding the cargo bed in a front direction, and the 4 passengers transformation not expanding the cargo bed.

FIG. 26 shows an example of the expandable cargo bed disclosed in the related art documents. A cargo bed 400 has a stationary bottom plate 401, right and left stationary side panels 402, a pair of right and left expandable side panels 404 provided at the front ends of the stationary side panels 402 and rotatably supported about hinge shafts 403, an expandable bottom plate 405 provided at the front end of the stationary bottom plate 401, and a front panel 406. A screen shield 407 is integrally formed with the front panel 406.

Pins 410 for positioning and fixing protruded in a downward direction are provided at the right and left ends of the screen shield 407. Pin insertion holes 411 and 412 into which each of the pins 410 of the screen shield 407 can be inserted are formed in the upper surface of the end of each of the expandable side panels 404 and the upper surface of the front end of each of the stationary side panels 402.

As indicated by the solid lines in FIG. 26, when the expandable side panels 404 are closed (4 passengers transformation), the screen shield 407 is located at the front ends of the stationary side panels 402 and the pins 410 of the screen shield 407 are inserted into the pin insertion holes 412 of the stationary side panels 402 from above. As indicated by the imaginary lines, when the expandable side panels 404 are opened in a front direction (2 passengers transformation), the screen shield 407 is located at the front ends of the expandable side panels 404 and the pins 410 of the screen shield 407 are inserted into the pin insertion holes 411 of the expandable side panels 404 from above.

With the above configuration, the screen shield 407 is moved between an expanded position when the cargo bed 400 is expanded and a non-expanded position when the cargo bed 400 is not expanded. The screen shield 407 need be lifted together with the front panel 406 to pull out the right and left pins 410 from the pin insertion holes 411 or 412. The screen shield 407 and the front panel 406 then need be integrally moved in a rear or front direction. After the movement, the pins 410 need be inserted into the pin insertion holes 412 or 411 from above again.

However, a weight of the screen shield 407 integrally having the front panel 406 is large, and a width of the screen shield 407 extends throughout the substantially whole width of the cargo bed 400. Therefore, it is very difficult to move the screen shield 407 by one person. Accordingly, at present, the screen shield 407 is lifted by grabbing the right and left ends of the screen shield 407 and the front panel 406 by two operators to pull out the pins 410. After the movement, the pins 410 need be inserted into the pin insertion holes 411 or 412 again. Thus, it takes time to move the screen shield 407.

SUMMARY OF THE INVENTION

The present invention has been made in view of the above problems and an object of the present invention is to simplify a moving operation of a screen shield with expanding and contracting operations of a cargo bed, thereby performing the operations easily and immediately even by one operator.

To achieve the above object, a first invention of the present invention provides a pick-up style utility vehicle including a front seat, a rear seat, and a cargo bed in this order from front, a cabin frame surrounding a riding space, and a screen shield partitioning the cargo bed and a rear riding space in front of the cargo bed, wherein the cargo bed can be changed between an expanded state in which the cargo bed is expanded in a front direction to the rear riding space and a non-expanded state not occupying the rear riding space, a backrest for the rear seat is attached to the screen shield, and the screen shield can be shifted between a position in the expanded state and a position in the non-expanded state when a seat bottom and the backrest of the rear seat are changed between a retracted state in which the seat bottom and the backrest are erected on the same straight line and a seatable used state.

With the above configuration, the seat bottom and the backrest of the rear seat are shifted in the operation of expanding or contracting the cargo bed, and thereby the position of the screen shield can be changed between the expanded position and the non-expanded position without lifting the screen shield. The position of the screen shield can be easily changed by one operator.

According to the present invention, preferably, the seat bottom and the backrest are rotatably coupled.

With the above configuration, the seat bottom and the backrest can be easily shifted.

According to the present invention, preferably, in the configuration in which the seat bottom and the backrest are rotatably coupled, the upper portion of the screen shield is attached to the upper portion of the cabin frame in the expanded state.

With the above configuration, the upper portion of the screen shield is held by the cabin frame. Thus, the screen shield can be held more stably.

According to the present invention, preferably, the upper portion of the screen shield is attached to the upper portion of the cabin frame, and the screen shield can be moved in a front-rear direction in the upper portion of the cabin frame.

With the above configuration, the screen shield is held by the cabin frame in both the expanded state and the non-expanded state of the cargo bed. The position in a front-rear direction where the cabin frame holds the screen shield can be changed according to the position in a front-rear direction of the screen shield. Thus, the screen shield can be held more stably.

According to the present invention, preferably, the lower portion of the screen shield can be attached to and detached from the seat bottom.

With the above configuration, the screen shield and the seat bottom to which the backrest is attached can be integrally rotated. Thus, the moving operation of the screen shield can be easily performed.

According to the present invention, preferably, in the configuration in which the seat bottom and the backrest are rotatably coupled, the screen shield has a rail on the front surface thereof, and the seat bottom and the backrest are moved on the rail when the cargo bed is changed between the expanded state and the non-expanded state.

With the above configuration, the seat bottom and the backrest are moved on the rail. The operation of changing the seat bottom and the backrest between the retracted state and the used state can be smoothly performed.

According to the present invention, preferably, the pick-up style utility vehicle further has a link mechanism coupling the seat bottom and the backrest, wherein the seat bottom and the backrest can be shifted between the retracted state and the used state by the link mechanism.

With the above configuration, the seat bottom and the backrest are shifted by the link mechanism. Thus, the shifting of the seat bottom and the backrest can be easily performed.

To achieve the above object, a second invention of the present invention provides a pick-up style utility vehicle including a front seat, a rear seat, and a cargo bed in this order from front, a cabin frame surrounding a riding space, and a screen shield partitioning the cargo bed and a rear riding space in front of the cargo bed, wherein the cargo bed can be changed between an expanded state in which the cargo bed is expanded in a front direction to the rear riding space and a non-expanded state not occupying the rear riding space, a seat bottom of the rear seat and the screen shield are rotatably coupled, and the screen shield can be shifted between a position in the expanded state and a position in the non-expanded state when the seat bottom and the screen shield are changed between a retracted state in which the seat bottom and the screen shield are erected on the same straight line and a seatable used state.

With the above configuration, the seat bottom of the rear seat and the screen shield are shifted in the operation of expanding or contracting the cargo bed. The position of the screen shield can be changed between the expanded position and the non-expanded position without lifting the screen shield. That is, the position of the screen shield can be easily changed by one operator.

According to the present invention, preferably, the cargo bed has a pair of right and left side panels, the side panels are the side panels of the cargo bed in the expanded state and the non-expanded state and are the side panels of the rear seat in the non-expanded state, the seat bottom can be rotated via the front ends of the side panels, and the seat bottom and the screen shield are rotated via the front ends of the side panels in the expanded state and are held in the retracted state.

With the above configuration, the side panels of the cargo bed need not be provided in the expanded state. Thus, the configuration of the cargo bed can be simplified. The seat bottom of the rear seat is rotatable via the side panels of the cargo bed. Therefore, when the cargo bed becomes in a dump state in which the cargo bed is tilted downward in a rear direction, the rear seat also becomes in a dump state together with the cargo bed. As a result, the maintenance of an engine provided below the cargo bed and components around the engine can be easily performed.

According to the present invention, preferably, the seat bottom is provided so as to be rotatable relative to a bottom plate of the cargo bed, the seat bottom is rotated relative to the bottom plate in the expanded state and has a bottom portion configuring the expandable bottom plate formed in a front direction from the front end of the bottom plate, the screen shield has a pair of right and left panel members openable and closeable right and left in a rear direction, and the panel members configure front panels of the cargo bed in the non-expanded state and configure expandable side panels expanding the side panels of the cargo bed extended in a front direction from the front ends of the side panels of the cargo bed in the expanded state.

With the above configuration, the bottom portion of the seat bottom configures the expandable bottom plate in the expanded state of the cargo bed. Thus, the screen shield is located in a more front direction by a length in a front-rear direction of the seat bottom. Accordingly, the housing space of the cargo bed can be increased. The screen shield has the expandable side panels in the expanded state of the cargo bed. It is not necessary to additionally provide the expandable side panels. The configuration of the cargo bed can be simplified.

DETAILED DESCRIPTION OF THE PREFERRED EMBODIMENTS

[First Embodiment of the Present Invention]

Figure 1:
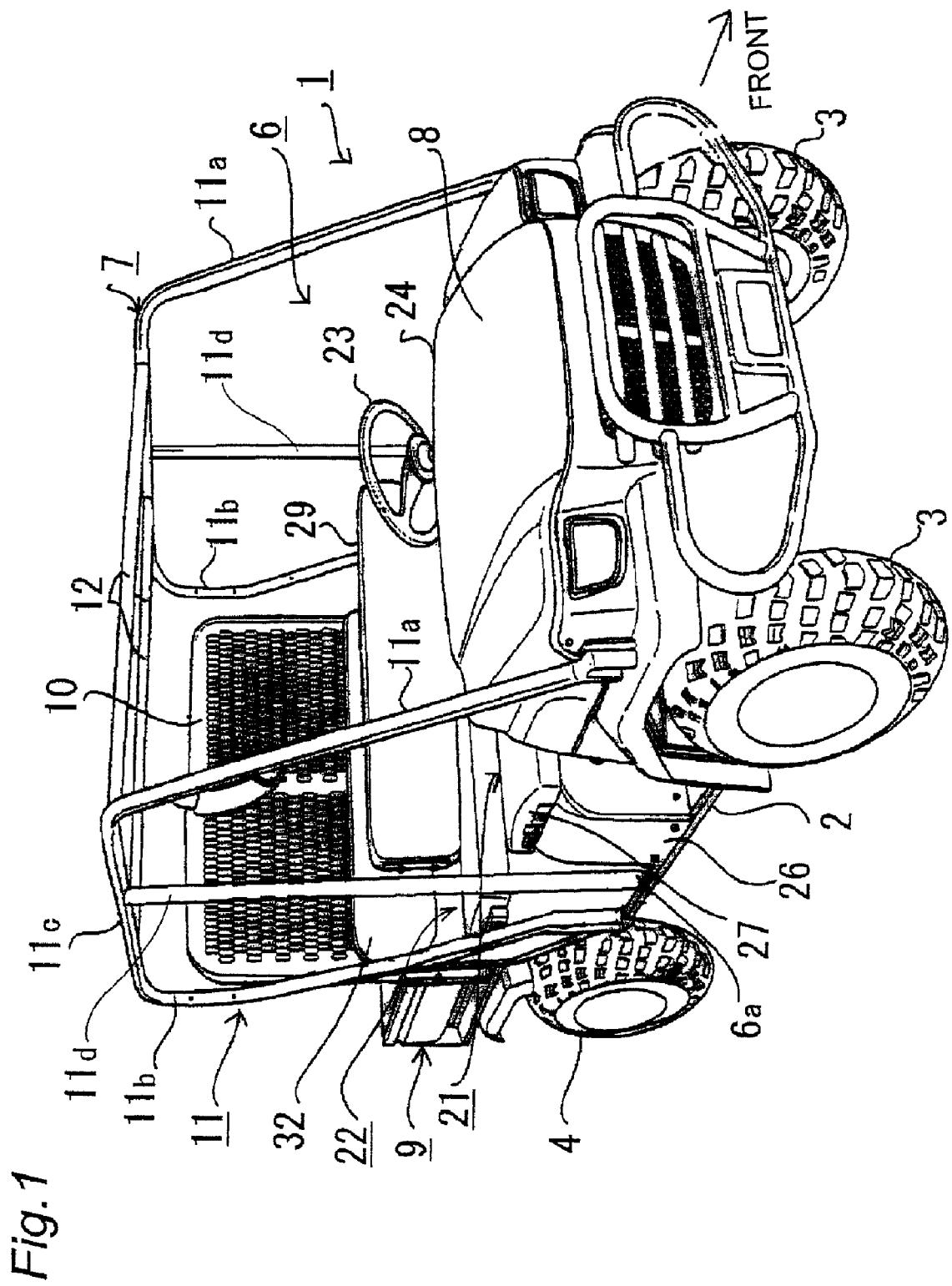
FIG. 1 is an overall perspective view of a pick-up style utility vehicle according to a first embodiment of the present invention.
Figure 2:
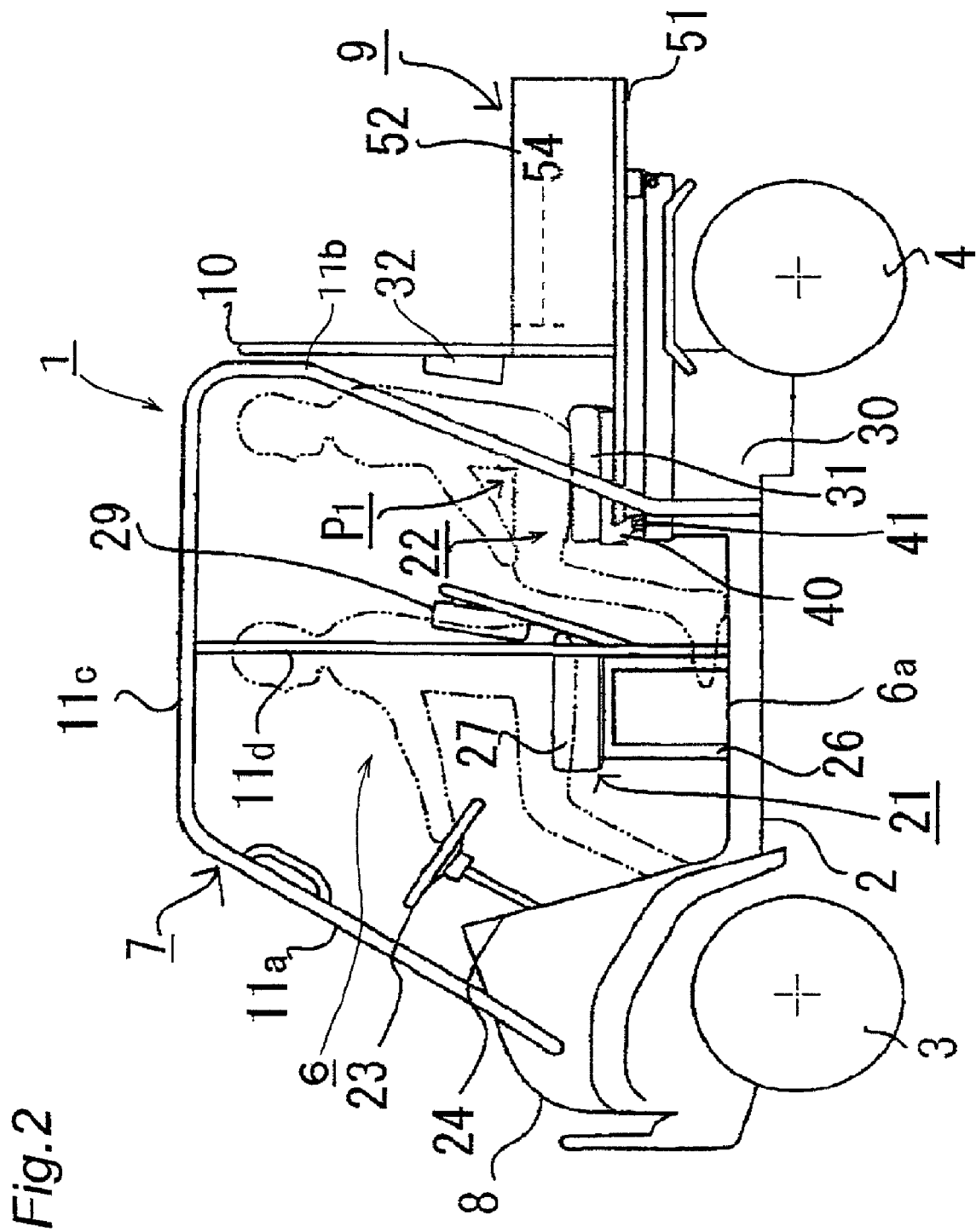
FIG. 2 is a left side view of the pick-up style utility vehicle of FIG. 1 when a cargo bed is in a non-expanded state.
Figure 3:
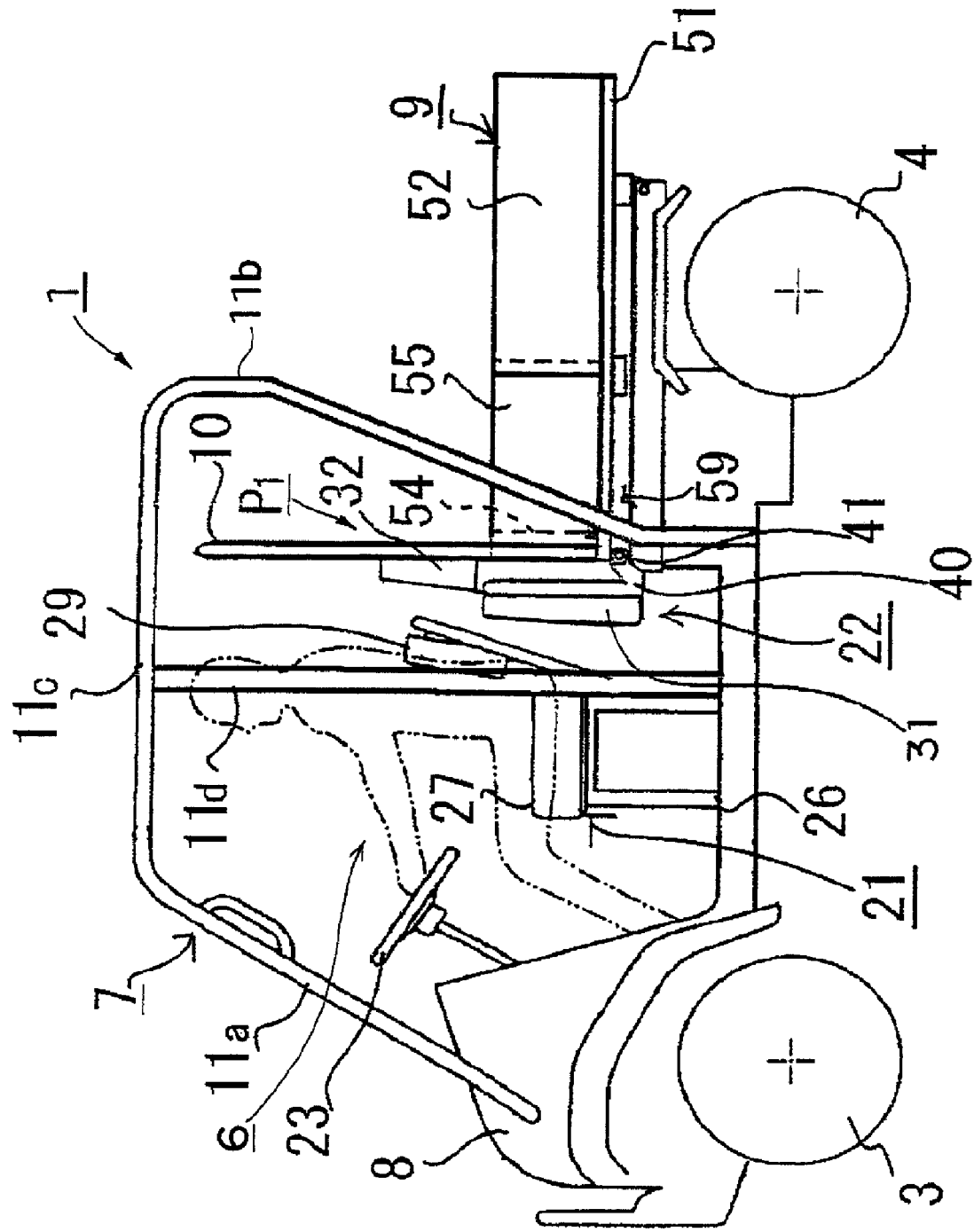
FIG. 3 is a left side view of the pick-up style utility vehicle of FIG. 1 when the cargo bed is in an expanded state.

FIGS. 1 to 3 show a pick-up style utility vehicle 1 with an expandable cargo bed according to a first embodiment of the present invention. The pick-up style utility vehicle 1 can be changed between 4 passengers transformation contracting a cargo bed 9, as shown in FIG. 2 and 2 passengers transformation folding a rear seat 22 and expanding the cargo bed 9 in a front direction, as shown in FIG. 3. The configuration of the pick-up style utility vehicle will be described below in detail with reference to the drawings.

FIG. 1 is a perspective view of the pick-up style utility vehicle 1. The pick-up style utility vehicle 1 has a vehicle body 2 supported by a pair of right and left front wheels 3 and a pair of right and left rear wheels 4. A cabin frame 7 configuring a cabin 6 is provided in an intermediate portion above the vehicle body 2 in a front-rear direction. A hood 8 is provided in front of the cabin frame 7. The cargo bed 9 is provided behind the cabin frame 7. A screen shield 10 partitioning the cargo bed 9 and a riding space is provided at the front end of the cargo bed 9 so as to be adjustable in a front-rear direction.

The cabin frame 7 surrounding the cabin 6 has a pair of right and left side frame members 11 formed in an inverted U-shape and made of metal pipes, and a plurality of cross frame members 12 made of metal pipes coupling the side frame members 11. Each of the side frame members 11 has a front side portion 11a extended in a rear direction and in an up direction from near the right or left side portion of the hood 8, a rear side portion 11b extended in a substantially up direction from the right or left side portion at the rear end of the cabin 6, an upper side portion 11c integrally coupling the upper end of the front side portion 11a and the upper end of the rear side portion 11b and extended in a front-rear direction, and an intermediate longitudinal portion 11d coupling the intermediate portion of the upper side portion 11c in a front-rear direction and a floor surface 6a.

A bench-shaped front seat 21 is installed in the front half portion of the cabin 6. A bench-shaped rear seat 22 is installed in the rear half portion of the cabin 6. A dashboard (operating portion) 24 having a steering wheel 23 and the like is provided at the front end of the cabin 6.

FIG. 2 is a left side view of pick-up style utility vehicle 1 in the 4 passengers transformation. The bench-shaped front seat 21 has a seat leg 26 erected on the floor surface 6a of the cabin 6, a seat bottom 27 provided on the upper end face of the seat leg 26, and a backrest 29 fixed via a supporting stay on the intermediate longitudinal portions 11d. The bench-shaped front seat 21 is typically extended in a right-left direction to near the right and left ends of the cabin 6. With this configuration, two persons can be seated on the bench-shaped front seat 21 side by side. A driver can be seated on one of seating areas (left side) and a passenger can be seated on the other seating area. The bench-shaped rear seat 22 has a seat bottom 31 arranged on the upper side of a box 30 housing an engine (not shown). As in the front seat 21, the seat bottom 31 is extended in a right-left direction to near the right and left ends of the cabin 6. Therefore, two passengers can be seated on the bench-shaped rear seat 22 side by side.

The configuration of the rear seat 22 will be described in detail. The seat bottom 31 is fixed onto the upper surface of a supporting base 40. The front end of the supporting base 40 is rotatably supported at the front upper end of the box 30 via hinges 41.

FIG. 3 is a left side view of pick-up style utility vehicle 1 in the 2 passengers transformation. The seat bottom 31 is rotated about the hinges 41 so as to become in a substantially vertical state so that the rear seat 22 becomes in a retracted state. The rear seat 22 is retracted to use a rear portion riding space P1 as the forward expanded space of the cargo bed 9.

Figure 4:
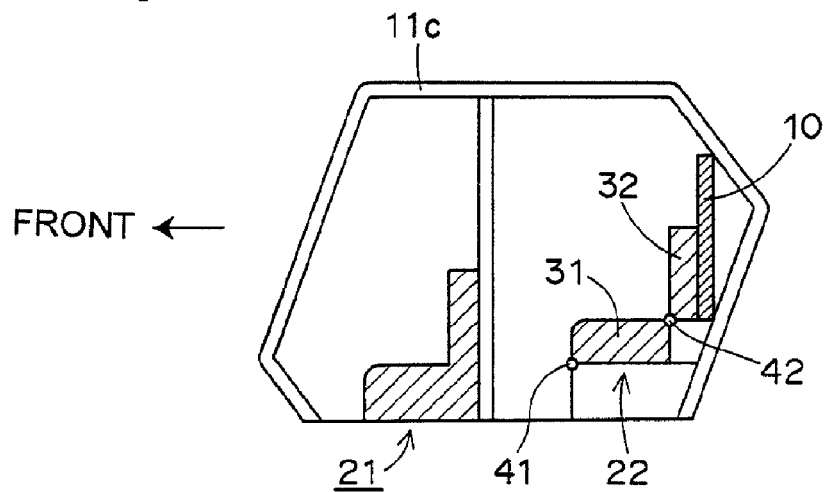
FIG. 4 is a left side schematic diagram of the screen shield 10 in 4 passengers transformation.
Figure 5:
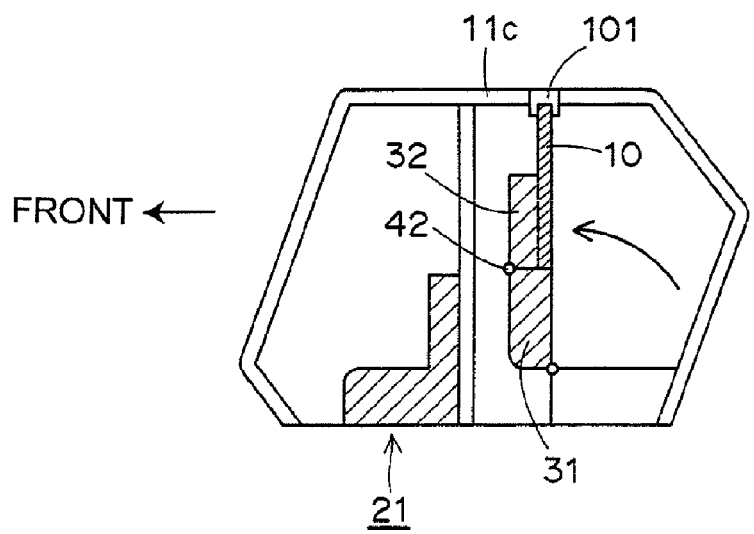
FIG. 5 is a left side schematic diagram of screen shield 10 in 2 passengers transformation.

The configuration of the screen shield 10 will be described in detail. FIG. 4 is a left side schematic diagram of the pick-up style utility vehicle 1 in the 4 passengers transformation. FIG. 5 is a left side schematic diagram of the pick-up style utility vehicle 1 in the 2 passengers transformation. As shown in FIG. 1, the screen shield 10 has a frame made of a metal pipe formed in an inverted U-shape, and a resin or metal net provided to the frame. A backrest 32 for the passenger seating on the rear seat 22 is attached to the net.

As shown in FIG. 4, the backrest 32 and the seat bottom 31 of the rear seat 22 are rotatable via hinges 42. As described above, the seat bottom 31 is rotatable via the hinges 41.

When the 4 passengers transformation of FIG. 4 is changed to the 2 passengers transformation of FIG. 5, as shown in FIG. 5, the seat bottom 31 is rotated in a front direction about the hinges 41 so as to be in a substantially erected state. The backrest 32 coupled to the seat bottom 31 via the hinges 42 is moved in a front direction according to the rotation of the seat bottom 31 and is located in a substantially erected state on the same straight line as the seat bottom 31 in the upper portion of the seat bottom 31 in a substantially erected state. The screen shield 10 is coupled to the backrest 32 and is moved in a front direction according to the movement of the backrest 32. A fixing means 101 is attached to the upper portion of the screen shield 10. The screen shield 10 is fixed to the upper side portions 11*c* of the side frame members 11 by the fixing means 101.

As described above, in this embodiment, it is not necessary to lift and move the screen shield 10. The operation of changing the 4 passengers transformation to the 2 passengers transformation can be easily performed by one person.

When the 2 passengers transformation shown in FIG. 5 is changed to the 4 passengers transformation shown in FIG. 4, the above operation may be reversed. Also in this case, it is not necessary to lift and move the screen shield 10, so that the operation of changing the 2 passengers transformation to the 4 passengers transformation can be easily performed by one person.

Since the screen shield 10 has the fixing means 101, the upper portion of the screen shield 10 is fixed to the side frame members 11. As a result, the screen shield 10 can be reliably held in the 2 passengers transformation.

[Modification Example 1 of the First Embodiment]

Figure 6:
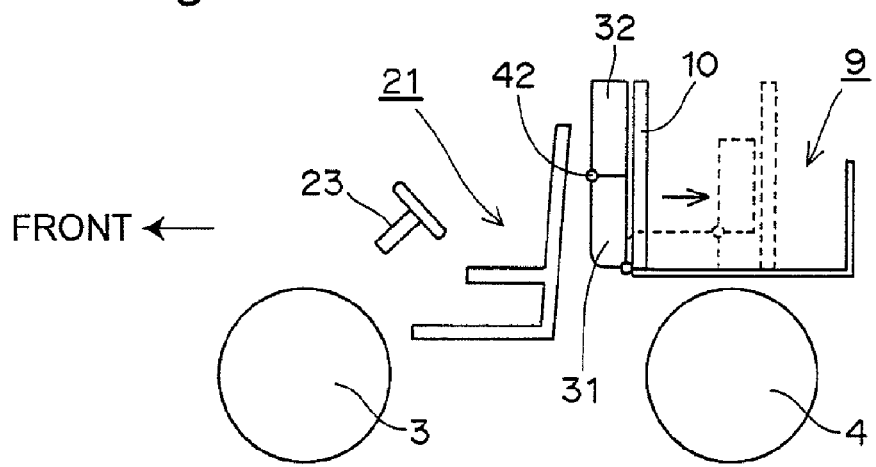
FIG. 6 is a left side schematic diagram of the pick-up style utility vehicle in the 2 passengers transformation.

As shown in FIG. 6, a length in an up-down direction of the screen shield 10 may be the same as a length in an up-down direction of the seat bottom 31 and the backrest 32 in a substantially erected state on the same straight line in the 2 passengers transformation. When the screen shield 10 and the seat bottom 31 are coupled in the 2 passengers transformation, the seat bottom 31 and the backrest 32 can be supported by the screen shield 10. As a result, the screen shield 10 can have a reinforcing function of the seat bottom 31 and the backrest 32 in the 2 passengers transformation.

[Second Embodiment]

Figure 7:
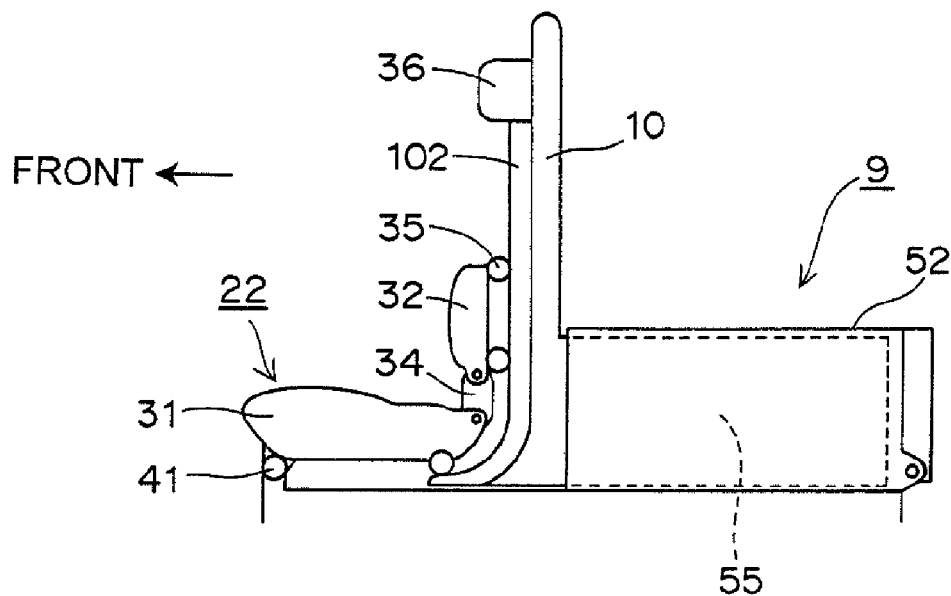
FIG. 7 is a left side schematic diagram of the expandable cargo bed 9 and screen shield 10 in the 4 passengers transformation according to a second embodiment of the present invention.
Figure 8:
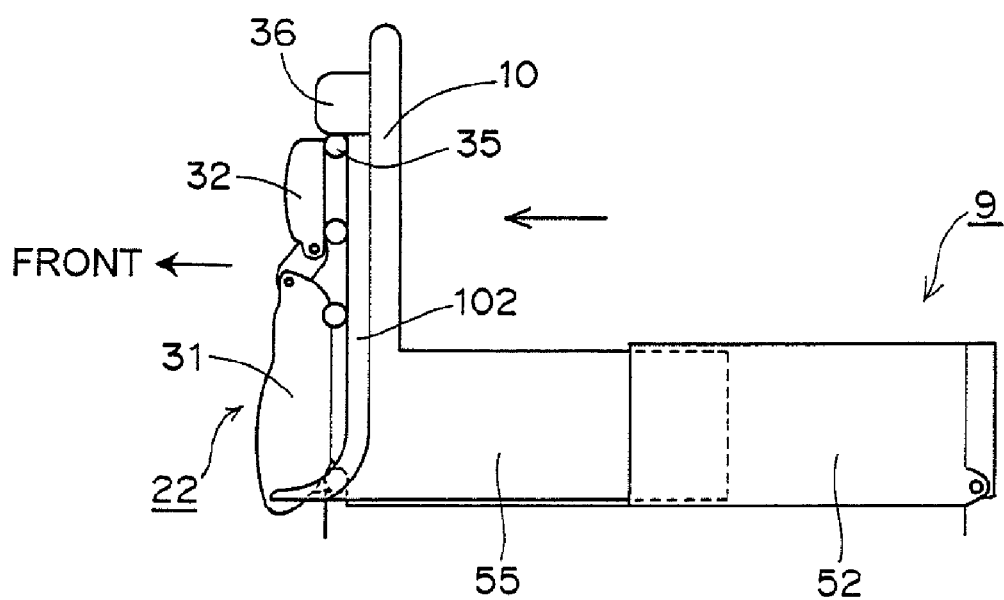
FIG. 8 is a left side schematic diagram of expandable cargo bed 9 and screen shield 10 in the 2 passengers transformation.

FIGS. 7 and 8 are a second embodiment of the present invention. FIG. 7 is a left side schematic diagram of the expandable cargo bed 9 and the screen shield 10 in the 4 passengers transformation. FIG. 8 is a left side schematic diagram of the expandable cargo bed 9 and the screen shield 10 in the 2 passengers transformation. The second embodiment has the same configuration as that of the first embodiment except that the following configurations (a) and (b) are different. Like components are indicated by like reference numerals.

(a) As shown in FIG. 7, the seat bottom 31 and the backrest 32 are coupled by a coupling portion 34. A rail 102 is attached to the front surface of the screen shield 10. Rotatable rolls 35 are attached to the seat bottom 31 and the backrest 32 and can be moved on the rail 102 so that the seat bottom 31 and the backrest 32 are moved. The headrest 36 is attached to the upper end of the rail 102.

(b) The cargo bed 9 has the pair of right and left expandable side panels 55 for expanding the cargo bed 9 in a front direction. The pair of expandable side panels 55 are arranged inward in a vehicle width direction of the stationary side panels 52. The expandable side panels 55 are slidable in a front-rear direction.

When the 4 passengers transformation of FIG. 7 is changed to the 2 passengers transformation of FIG. 8, as shown in FIG. 8, expandable side panels 55 are slid in a front direction. The screen shield 10 is moved in a front direction according to the movement of the expandable side panels 55 in a front direction. When the screen shield 10 is moved in a front direction, the seat bottom 31 and the backrest 32 are moved in an up direction along the rail 102 of the front surface of the screen shield 10 and become in a substantially erected state, as shown in FIG. 8.

As described above, in this embodiment, it is not necessary to lift and move the screen shield 10. The screen shield 10 is moved in a front direction so that the expandable side panels 55 are slid in a front direction and the seat bottom 31 and the backrest 32 are moved along the rail 102 so as to be retracted in a substantially erected state. Thus, the operation of changing the 4 passengers transformation to the 2 passengers transformation can be performed more smoothly.

When the 2 passengers transformation shown in FIG. 8 is changed to the 4 passengers transformation shown in FIG. 7, the above operation may be reversed. Also in this case, it is not necessary to lift and move the screen shield 10, so that the operation of changing the 2 passengers transformation to the 4 passengers transformation can be performed more smoothly.

The headrest 36 is attached to the upper end of the rail 102. Thus, the backrest 32 can be fixed by the headrest 36 in the 2 passengers transformation. Therefore, the seat bottom 31 and the backrest 32 can be easily held in a substantially erected state in the 2 passengers transformation.

[Third Embodiment]

Figure 9:
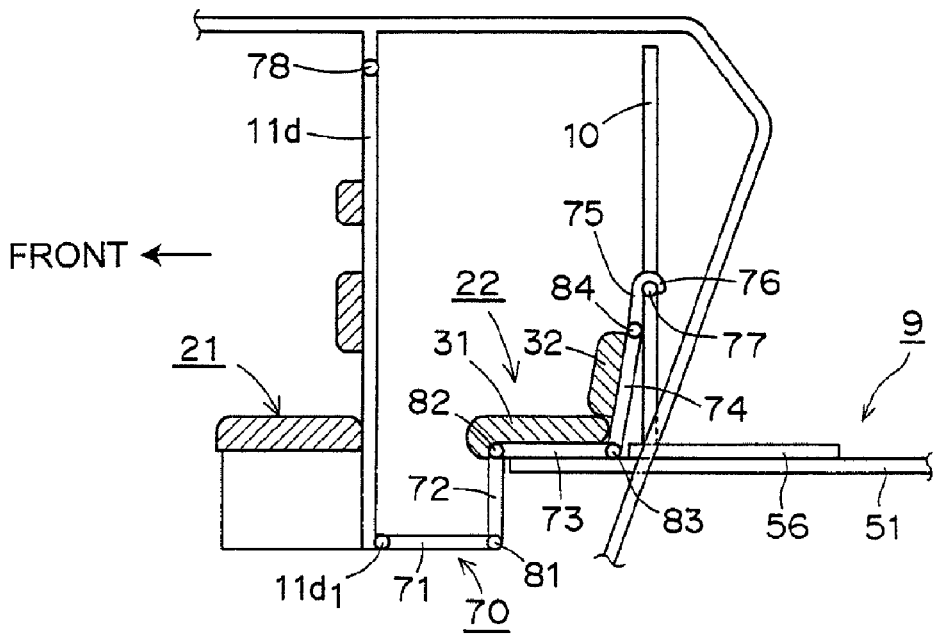
FIG. 9 is a left side schematic diagram of expandable cargo bed 9 and screen shield 10 in the 4 passengers transformation according to a third embodiment of the present invention.
Figure 10:
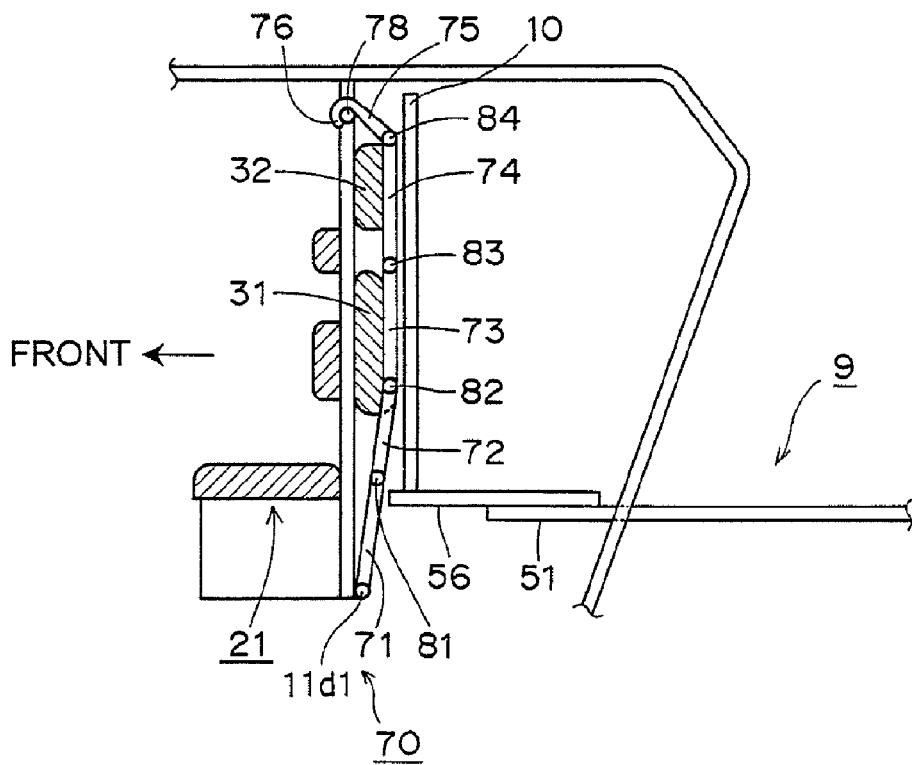
FIG. 10 is a left side schematic diagram of expandable cargo bed 9 and screen shield 10 in the 2 passengers transformation.

FIGS. 9 and 10 are a third embodiment of the present invention. FIG. 9 is a left side schematic diagram of the expandable cargo bed 9 and the screen shield 10 in the 4 passengers transformation. FIG. 10 is a left side schematic diagram of the expandable cargo bed 9 and the screen shield 10 in the 2 passengers transformation. The third embodiment has the same configuration as that of the first embodiment except that the following configurations (c), (d), and (e) are different. Like components are indicated by like reference numerals.

(c) As shown in FIG. 9, pick-up style utility vehicle 1 has link mechanisms 70. The link mechanisms 70 have a pair of right and left arms 71 to 75 and a pair of right and left fulcrums 81 to 84. One end of each of the arms 71 is rotatably coupled to the fulcrum 11*d*1 in the lower portion of the intermediate longitudinal member 11*d* of the side frame member 11. The other end of each of the arms 71 and each of the arms 72 are rotatably coupled via the fulcrum 81. Each of the arms 72 and each of the arms 73 are rotatably coupled via the fulcrum 82. Each of the arms 73 and each of the arms 74 are rotatably coupled via the fulcrum 83. Each of the arms 74 and each of the arms 75 are rotatably coupled via the fulcrum 84. A hook 76 is attached to the end of each of the arms 75.

(d) The seat bottom 31 is attached to the arms 73. The backrest 32 is attached to the arms 74. A pair of right and left protrusion portions 77 hooked onto the hooks 76 in the 4 passengers transformation are provided in the center portions of the side portions of screen shield 10. A pair of right and left protrusion portions 78 hooked onto the hooks 76 in the 2 passengers transformation are provided in the upper portions of the intermediate longitudinal members 11*d* of the side frame members 11.

(e) As shown in FIG. 10, cargo bed 9 has the stationary bottom plate 51, and the expandable bottom plate 56 extended in a front direction from the front end of the stationary bottom plate 51. The lower portion of the screen shield 10 is fixed to the expandable bottom plate 56.

When the 4 passengers transformation of FIG. 9 is changed to the 2 passengers transformation of FIG. 10, the hooks 76 hooking the protrusion portions 77 are unhooked. As shown in FIG. 10, the link mechanisms 70 are rotated in a front direction about the fulcrums 11*d*1. The arms 71 to 74 become in a substantially erected state. The seat bottom 31 attached to the arms 73 and the backrest 32 attached to the arms 74 also become in a substantially erected state when the arms 73 and 74 become in an erected state. The arms 75 are rotated via the fulcrums 84 relative to the arms 74 in a substantially erected state so as to be tilted in a front direction. The hooks 76 attached to the ends of the arms 75 hook the protrusion portions 78. The expandable bottom plate 56 is then slid in a front direction. When the expandable bottom plate 56 is moved in a front direction, the screen shield 10 is moved in a front direction and is located on the rear surfaces of the link mechanisms 70.

As described above, in this embodiment, it is not necessary to lift and move the screen shield 10. The screen shield 10 is moved in a front direction by sliding the expandable bottom panel 56 in a front direction. The operation of changing the 4 passengers transformation to the 2 passengers transformation can be performed more easily.

When the 2 passengers transformation shown in FIG. 10 is changed to the 4 passengers transformation shown in FIG. 9, the above operation may be reversed. Also in this case, it is not necessary to lift and move the screen shield 10, so that the operation of changing the 2 passengers transformation to the 4 passengers transformation can be performed more easily.

The seat bottom 31 is attached to the arms 73 of the link mechanisms 70. The backrest 32 is attached to the arms 74 of the link mechanisms 70. Thus, the link mechanisms 70 are operated so that the seat bottom 31 and the backrest 32 can be easily changed between a seatable used state in the 4 passengers transformation and a retracted state in which the seat bottom 31 and the backrest 32 are erected on the same straight line in the 2 passengers transformation.

One end of each of the arms 71 of the link mechanisms 70 is attached to the fulcrum 11d1 of the intermediate longitudinal member 11d of the side frame member 11. The hooks 76 of the link mechanisms 70 hook the protrusion portions 78 of the intermediate longitudinal members 11d. Therefore, the link mechanisms 70 become in a substantially erected state along the intermediate longitudinal members 11d in the 2 passengers transformation. As a result, the seat bottom 31 and the backrest 32 are located in a more front direction than the first embodiment. The housing space of the cargo bed 9 can be increased.

[Fourth Embodiment]

Figure 11:
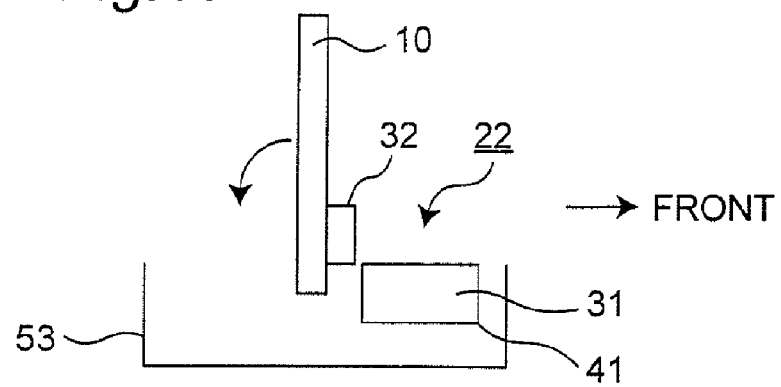
FIG. 11 is a right side schematic diagram of expandable cargo bed 9 and screen shield 10 in the 4 passengers transformation according to a fourth embodiment of the present invention.
Figure 12:
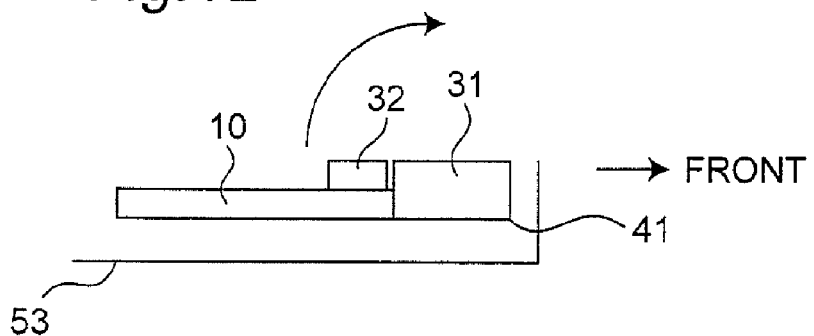
FIG. 12 is a right side schematic diagram when the 4 passengers transformation is being changed to the 2 passengers transformation.
Figure 13:
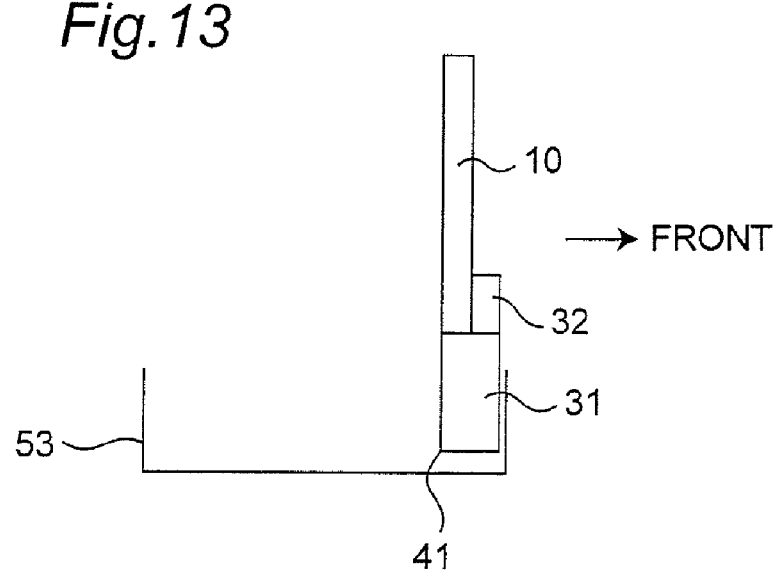
FIG. 13 is a right side schematic diagram of expandable cargo bed 9 and screen shield 10 in the 2 passengers transformation.

FIGS. 11 to 13 are a fourth embodiment of the present invention. FIG. 11 is a right side schematic diagram of the expandable cargo bed 9 and the screen shield 10 in the 4 passengers transformation. FIG. 13 is a right side schematic diagram of the expandable cargo bed 9 and the screen shield 10 in the 2 passengers transformation. FIG. 12 is a right side schematic diagram when the 4 passengers transformation of FIG. 11 is being changed to the 2 passengers transformation of FIG. 13. The fourth embodiment has the same configuration as that of the first embodiment except that the following configuration (f) is different. Like components are indicated by like reference numerals.

(f) As shown in FIGS. 11 to 13, the cargo bed 9 has a rear panel 53 rotatable in a rear direction. The screen shield 10 to which the backrest 32 is attached is rotatable in a rear direction. As shown in FIG. 12, after being rotated in a rear direction, the screen shield 10 can be attached to the rear surface of the seat bottom 31.

When the 4 passengers transformation of FIG. 11 is changed to the 2 passengers transformation of FIG. 13, as shown in FIG. 11, the rear panel 53 of cargo bed 9 is rotated in a rear direction so as to become in a substantially horizontal state. Accordingly, the interference of the screen shield 10 and the rear panel 53 when the screen shield 10 is rotated in a rear direction can be prevented. As shown in FIG. 12, the screen shield 10 is rotated in a rear direction so as to become in a substantially horizontal state. The backrest 32 is attached to the screen shield 10. When the screen shield 10 becomes in a substantially horizontal state, the backrest 32 also becomes in a substantially horizontal state accordingly. The screen shield 10 is attached to the rear surface of the seat bottom 31. As shown in FIG. 13, the seat bottom 31 is rotated in a front direction about the hinges 41 so as to become in a substantially erected state. According to the rotation of the seat bottom 31, the screen shield 10 attached to the rear surface of the seat bottom 31 is rotated in a front direction and is located in a substantially erected state on the same straight line as the seat bottom 31 in the upper portion of the seat bottom 31 in a substantially erected state. The backrest 32 attached to the screen shield 10 also becomes in a substantially erected state. The rear panel 53 of the cargo bed 9 is rotated in a front direction so as to become in a substantially erected state.

As described above, in this embodiment, it is not necessary to lift and move the screen shield 10. The seat bottom 31 is moved in a front direction so that the screen shield 10 is moved in a front direction. Therefore, the operation of changing the 4 passengers transformation to the 2 passengers transformation can be performed more easily.

When the 2 passengers transformation shown in FIG. 13 is changed to the 4 passengers transformation shown in FIG. 11, the above operation may be reversed. Also in this case, it is not necessary to lift and move the screen shield 10, so that the operation of changing the 2 passengers transformation to the 4 passengers transformation can be performed more easily.

[Fifth Embodiment]

Figure 14:
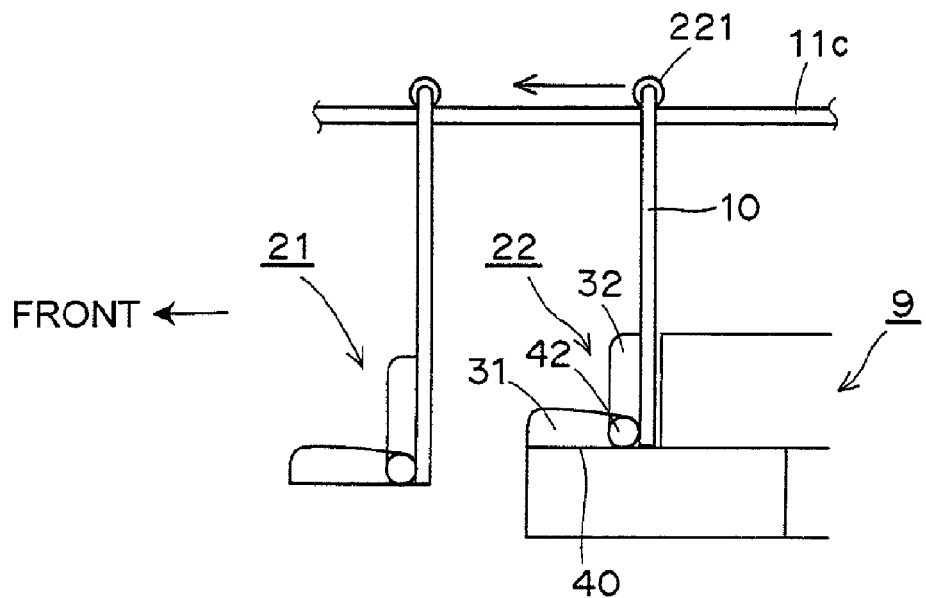
FIG. 14 is a left side schematic diagram of expandable cargo bed 9 and screen shield 10 in the 4 passengers transformation according to a fifth embodiment of the present invention.
Figure 15:
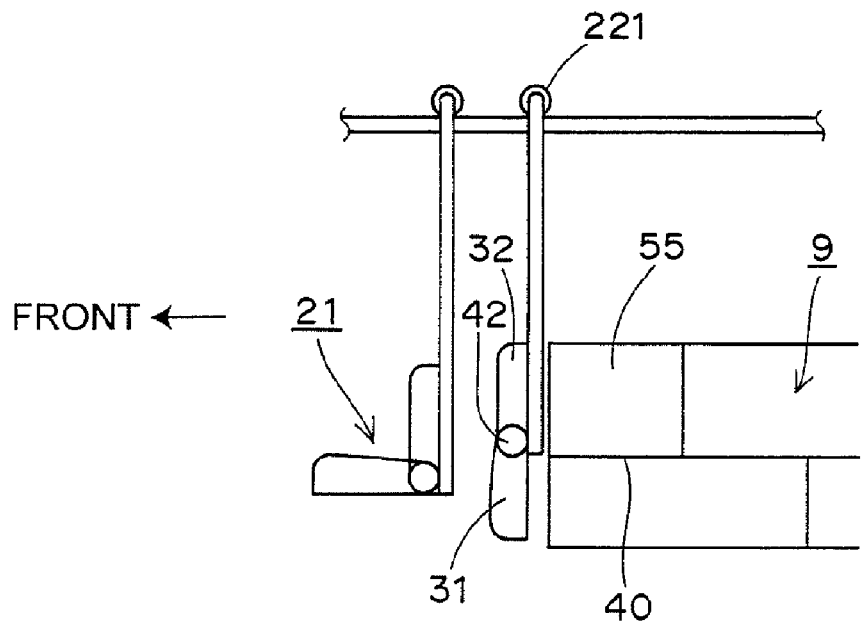
FIG. 15 is a left side schematic diagram of expandable cargo bed 9 and screen shield 10 in the 2 passengers transformation.

FIGS. 14 and 15 are a fifth embodiment of the present invention. FIG. 14 is a left side schematic diagram of the expandable cargo bed 9 and the screen shield 10 in the 4 passengers transformation. FIG. 15 is a left side schematic diagram of the expandable cargo bed 9 and the screen shield 10 in the 2 passengers transformation. The fifth embodiment has the same configuration as that of the first embodiment except that the following configurations (g) and (h) are different. Like components are indicated by like reference numerals.

(g) As shown in FIG. 14, the screen shield 10 is hung from the upper side portions 11c of the side frame members 11 by hanging members 221. The hanging members 221 are attached to the upper side portions 11c and can be moved in a front-rear direction along the upper side portions 11c.

(h) The seat bottom 31 and the backrest 32 of the rear seat 22 are rotatably coupled via the hinges 42. The seat bottom 31 is placed on the upper surface of the supporting base 40 in the 4 passengers transformation.

When the 4 passengers transformation of FIG. 14 is changed to the 2 passengers transformation of FIG. 15, the hanging members 221 are moved in a front direction along the upper side portions 11c of the side frame members 11. According to the movement of the hanging members 221 in a front direction, the screen shield 10 is moved in a front direction and the backrest 32 attached to the screen shield 10 is also moved in a front direction. When the seat bottom 31 is moved in a front direction and is located in front of the supporting base 40 according to the movement of the backrest 32 in a front direction, the seat bottom 31 is rotated about the hinges 42 by its own weight, so that the backrest 32 and the seat bottom 31 are erected on the same straight line.

As described above, in this embodiment, it is not necessary to lift and move the screen shield 10. The hanging members 221 are moved in a front direction so that the screen shield 10 is moved in a front direction. Thus, the operation of changing the 4 passengers transformation to the 2 passengers transformation can be performed more easily.

When the 2 passengers transformation shown in FIG. 15 is changed to the 4 passengers transformation shown in FIG. 14, the above operation may be reversed. Also in this case, it is not necessary to lift and move the screen shield 10, so that the operation of changing the 2 passengers transformation to the 4 passengers transformation can be performed more easily.

To limit the movement of the hanging members 221 in a front-rear direction in the upper side portions 11c of the side frame members 11, stoppers of the hanging members 221 are preferably provided to the upper side portions 11c. To fix the hanging members 221 in the positions of the hanging members 221 in the 4 passengers transformation and the positions of the hanging members 221 in the 2 passengers transformation, fixing jigs of the hanging members 221 are preferably provided to the upper side portions 11c.

Figure 16:
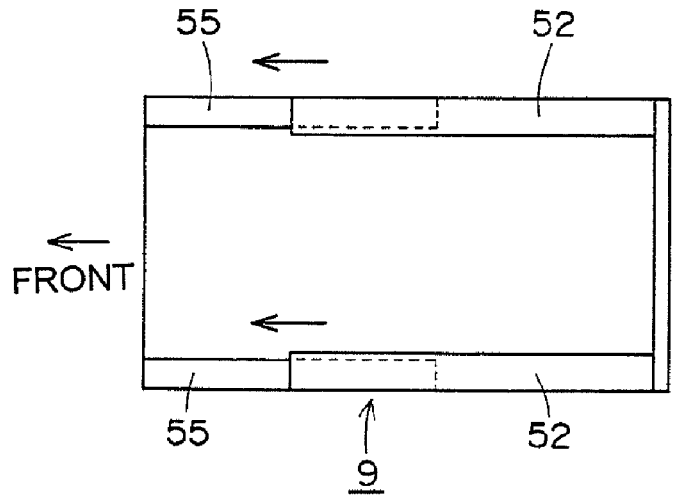
FIG. 16 is a top schematic diagram showing an expanding means of the expandable side panels 55 of cargo bed 9.
Figure 17:
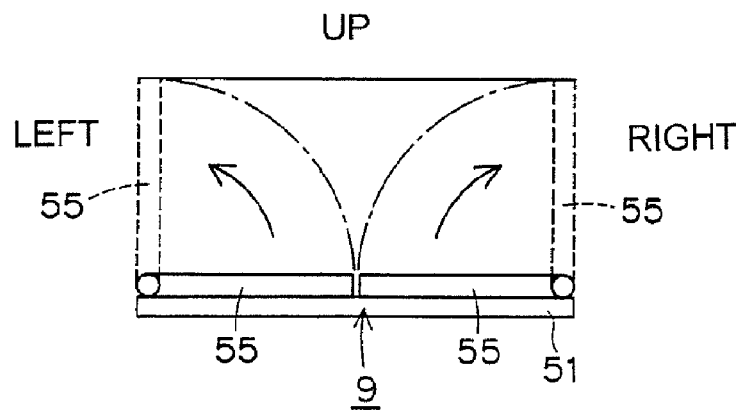
FIG. 17 is a rear schematic diagram showing the expanding means of expandable side panels 55 of cargo bed 9.
Figure 18:
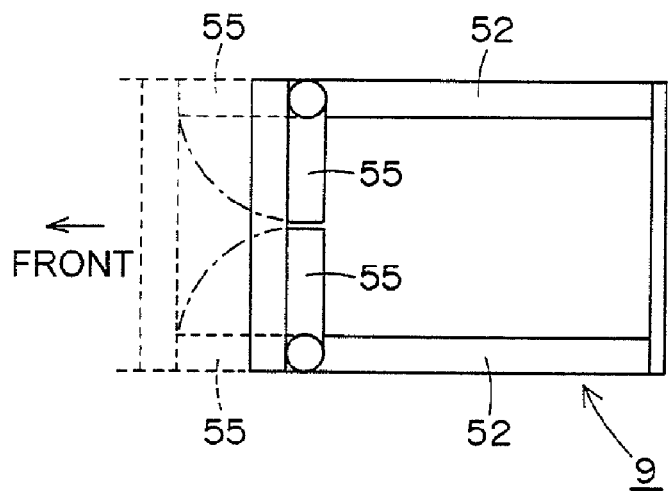
FIG. 18 is a top concept view showing the expanding means of expandable side panels 55 of cargo bed 9.

As shown in FIG. 16, the expandable side panels 55 of the cargo bed 9 when the cargo bed 9 is expanded may be formed so as to be slid in a front direction from the front ends of the stationary side panels 52. As shown in FIG. 17, when the cargo bed 9 is in the non-expanded state, the expandable side panels 55 may be located on the upper surface of the bottom plate 51 and may be formed so as to be erected right and left when the cargo bed 9 is expanded. As shown in FIG. 18, the expandable side panels 55 may form the front panel of the cargo bed 9 when the cargo bed 9 is in the non-expanded state, and may be formed so as to be opened right and left in a front direction when the cargo bed 9 is expanded.

[Sixth Embodiment]

Figure 19:
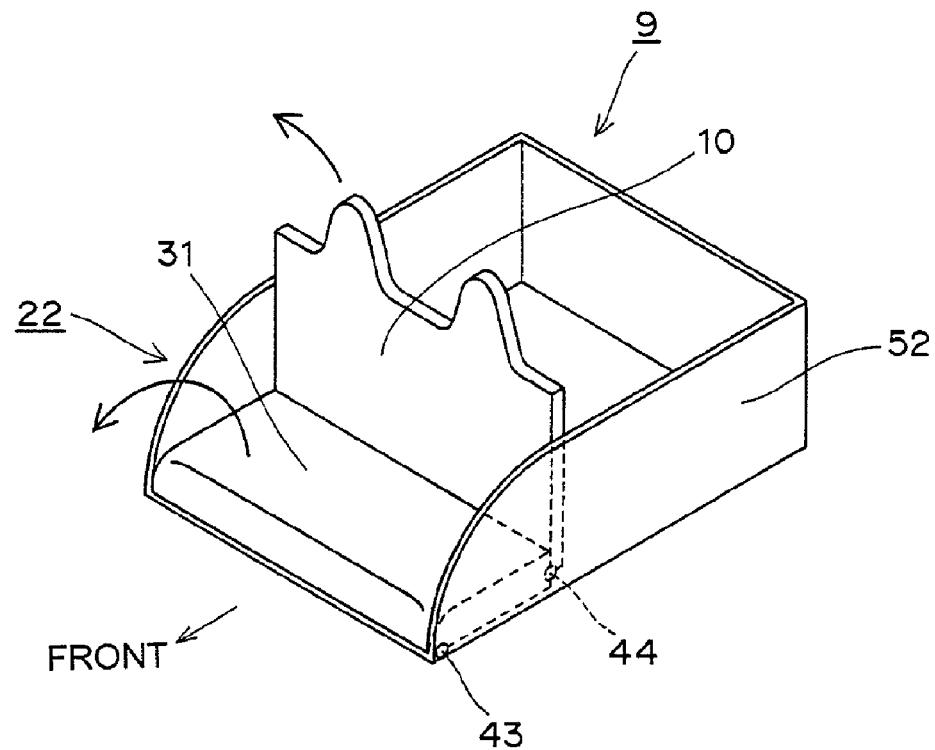
FIG. 19 is a schematic perspective view of expandable cargo bed 9 and screen shield 10 in the 4 passengers transformation according to a sixth embodiment of the present invention.
Figure 20:
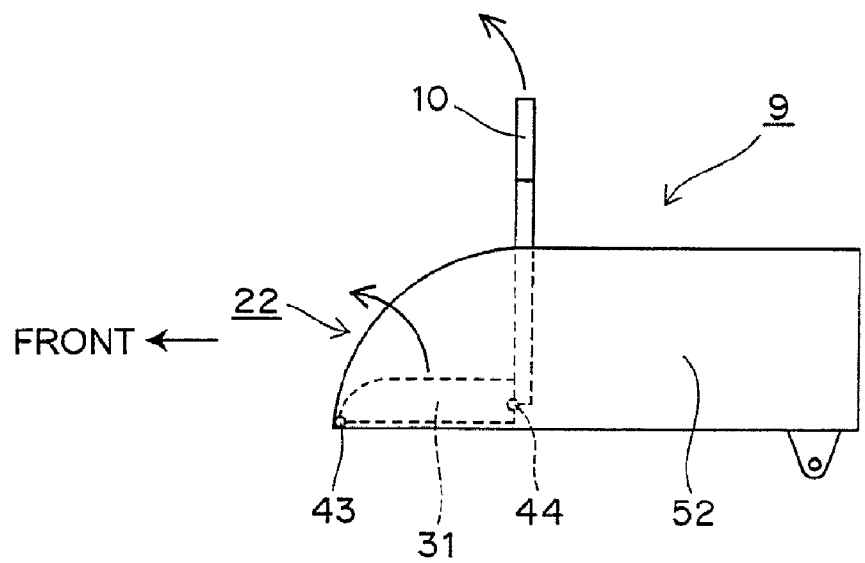
FIG. 20 is a left side schematic diagram of FIG. 19.
Figure 21:
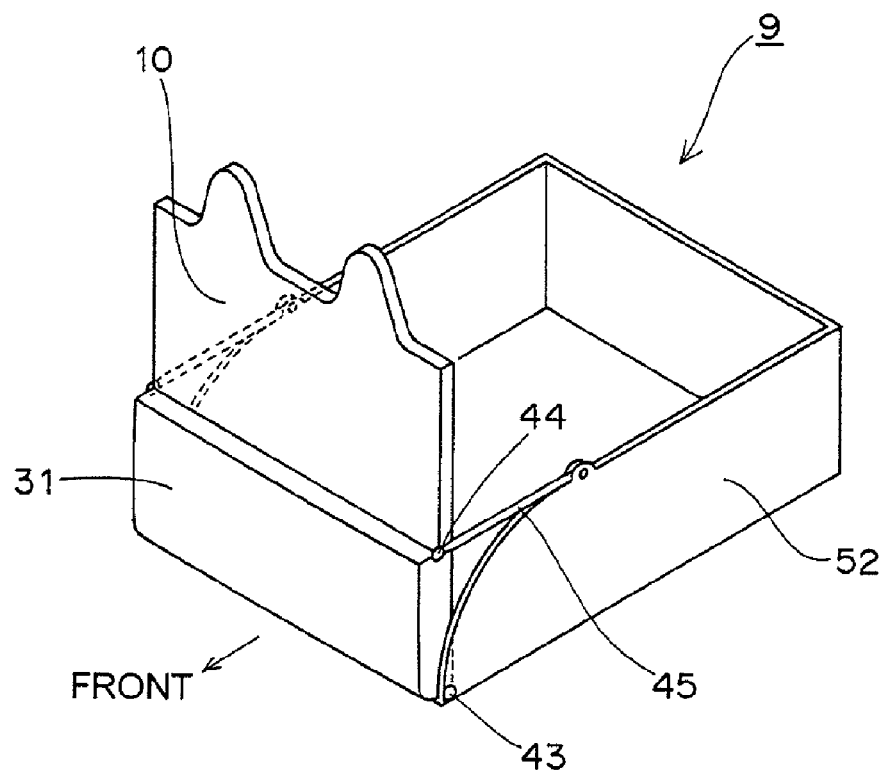
FIG. 21 is a schematic perspective view of expandable cargo bed 9 and screen shield 10 in the 2 passengers transformation.
Figure 22:
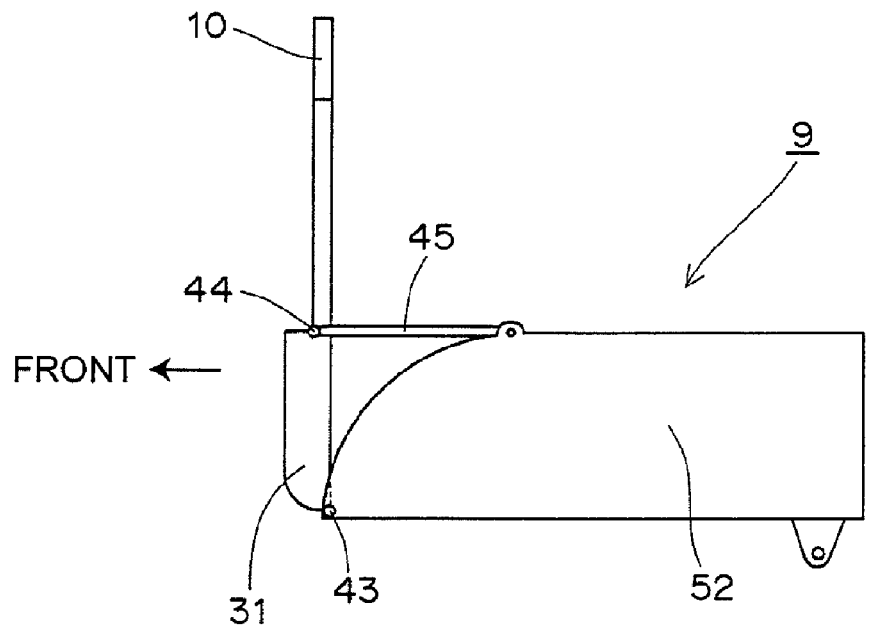
FIG. 22 is a left side schematic diagram of FIG. 21.

FIGS. 19 to 22 are a sixth embodiment of the present invention. FIG. 19 is a schematic perspective view of the expandable cargo bed 9 and the screen shield 10 in the 4 passengers transformation. FIG. 20 is a left side schematic diagram of FIG. 19. FIG. 21 is a schematic perspective view of the expandable cargo bed 9 and the screen shield 10 in the 2 passengers transformation. FIG. 22 is a left side schematic diagram of FIG. 21. The sixth embodiment has the same configuration as that of the first embodiment except that the following configurations (i) and (j) are different. Like components are indicated by like reference numerals.

(i) The stationary side panels 52 have a length in a front-rear direction extended to the sides of the rear seat 22. Pair of right and left hinges 43 are provided in the lower portions at the front ends of the stationary side panels 52. The seat bottom 31 of the rear seat 22 is rotatable via the hinges 43. The seat bottom 31 and the screen shield 10 are rotatably coupled via hinges 44.

(j) As shown in FIGS. 21 and 22, the screen shield 10 is coupled to the front portions of the stationary side panels 52 by a pair of right and left supporting rods 45 in the 2 passengers transformation.

When the 4 passengers transformation of FIG. 19 is changed to the 2 passengers transformation of FIG. 21, the seat bottom 31 is rotated in a front direction about the hinges 43 so as to become in a substantially erected state. According to the rotation of the seat bottom 31, the screen shield 10 coupled to the seat bottom 31 via the hinges 44 is also moved in a front direction. The screen shield 10 is rotated about the hinges 44 and is located in a substantially erected state on the same straight line as the seat bottom 31 in the upper portion of the seat bottom 31 in a substantially erected state. To hold the screen shield 10 in a substantially erected state, the screen shield 10 is coupled to the stationary side panels 52 via supporting rods 45.

As described above, in this embodiment, it is not necessary to lift and move the screen shield 10. The seat bottom 31 is rotated in a front direction so that the screen shield 10 is moved in a front direction. The operation of changing the 4 passengers transformation to the 2 passengers transformation can be performed more easily.

When the 2 passengers transformation shown in FIG. 21 is changed to the 4 passengers transformation shown in FIG. 19, the above operation may be reversed. Also in this case, it is not necessary to lift and move the screen shield 10, so that the operation of changing the 2 passengers transformation to the 4 passengers transformation can be performed more easily.

In this embodiment, the stationary side panels 52 have a length in a front-rear direction extended to the sides of the rear seat 22. Therefore, the expandable side panels of the cargo bed 9 need not be provided in the 2 passengers transformation. The configuration of the cargo bed 9 can be simplified. Since the rear seat 22 is integrated with the cargo bed 9, when the cargo bed 9 becomes in a dump state in which the cargo bed 9 is tilted downward in a rear direction, the rear seat 22 is in a dump state together with the cargo bed 9. As a result, the maintenance of an engine provided below the cargo bed 9 and components around the engine can be easily performed.

[Seventh Embodiment]

Figure 23:
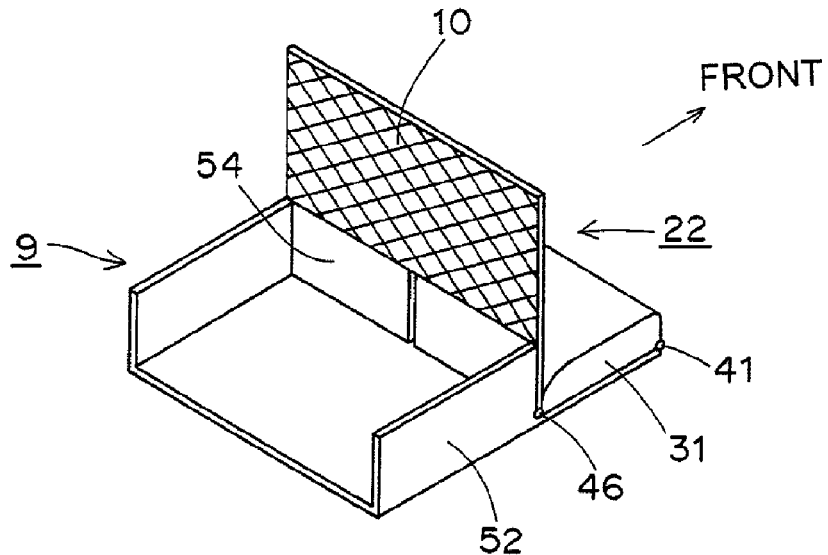
FIG. 23 is a right rearward schematic perspective view of expandable cargo bed 9 and screen shield 10 in the 4 passengers transformation according to a seventh embodiment of the present invention.
Figure 24:
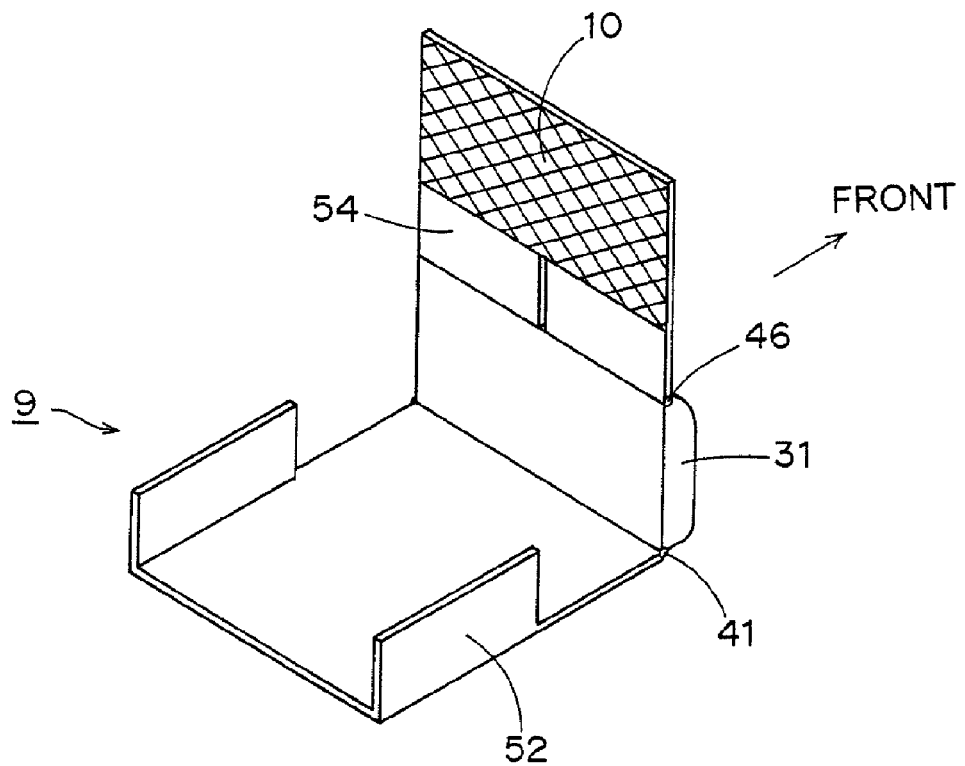
FIG. 24 is a right rearward schematic perspective view when the 4 passengers transformation is being changed to the 2 passengers transformation.
Figure 25:
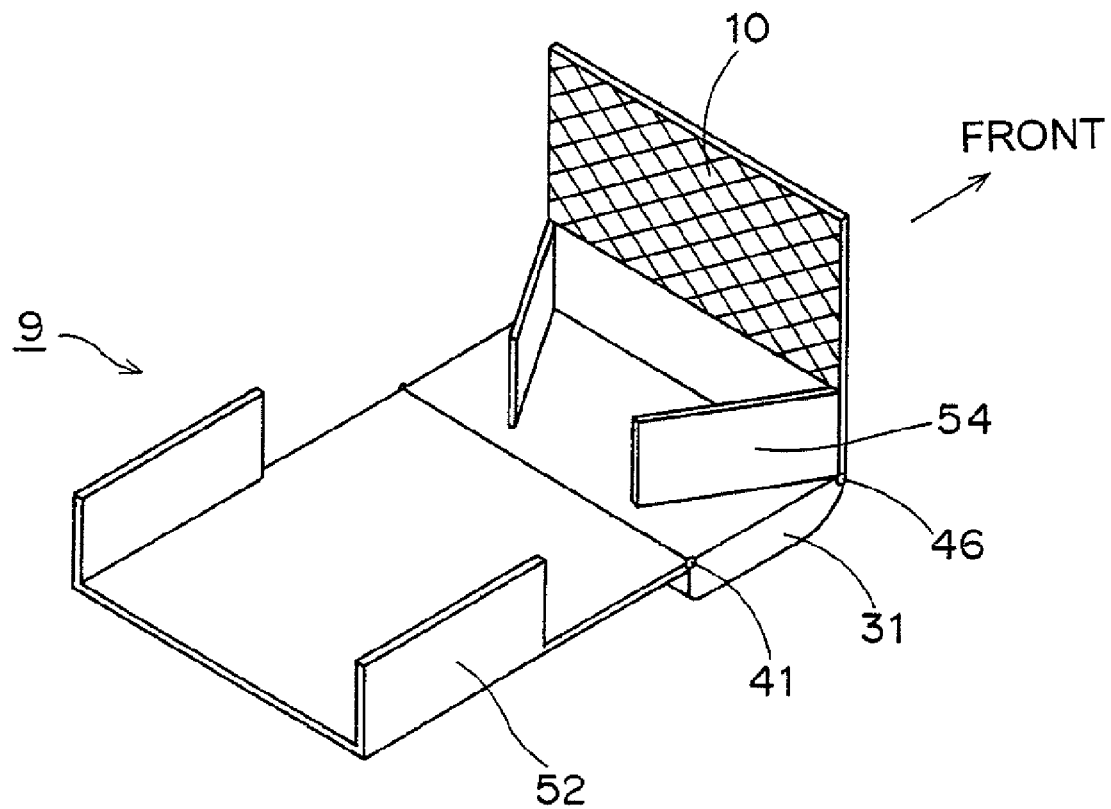
FIG. 25 is a right rearward schematic perspective view of expandable cargo bed 9 and screen shield 10 in the 2 passengers transformation.
Figure 26:
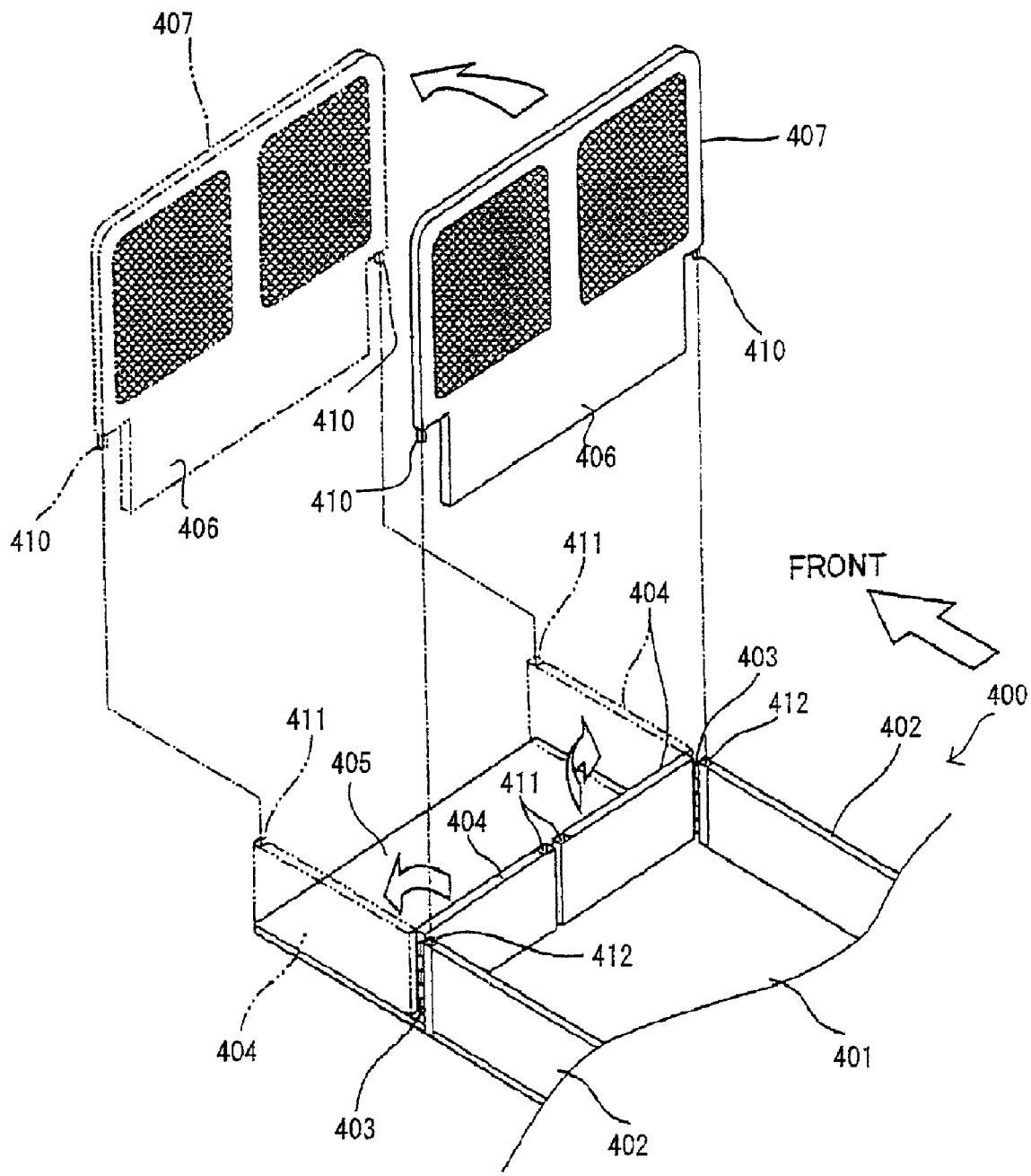
FIG. 26 is a perspective view of a cargo bed and a screen shield of the related art.

FIGS. 23 to 25 are a seventh embodiment of the present invention. FIG. 23 is a right rearward schematic perspective view of the expandable cargo bed 9 and the screen shield 10 in the 4 passengers transformation. FIG. 25 is a right rearward schematic perspective view of the expandable cargo bed 9 and the screen shield 10 in the 2 passengers transformation. FIG. 24 is a right rearward schematic perspective view when the 4 passengers transformation of FIG. 23 is changed to the 2 passengers transformation of FIG. 25. The seventh embodiment has the same configuration as that of the first embodiment except that the following configurations (k) and (l) are different. Like components are indicated by like reference numerals.

(k) As shown in FIG. 23, the front panels 54 of the cargo bed 9 are divided right and left and are provided integrally with the lower portion of the screen shield 10. The front panels 54 can be opened and closed right and left in a rear direction.

(l) The seat bottom 31 and the screen shield 10 having the front panels 54 are rotatably coupled via hinges 46.

When the 4 passengers transformation of FIG. 23 is changed to the 2 passengers transformation of FIG. 25, the seat bottom 31 is rotated in a front direction about the hinges 41 so as to become in a substantially erected state, as shown in FIG. 24. According to the rotation of the seat bottom 31, the screen shield 10 coupled to the seat bottom 31 via the hinges 46 is also moved in a front direction. The screen shield 10 is rotated about the hinges 46 and is located in a substantially erected state on the same straight line as the seat bottom 31 in the upper portion of the seat bottom 31 in a substantially erected state. The seat bottom 31 is rotated in a more front direction about the hinges 41 and is brought into a substantially horizontal state so that the back side of the seat bottom 31 in the 4 passengers transformation becomes the face side thereof, as shown in FIG. 25. The screen shield 10 is rotated about the hinges 46 and is brought into a substantially erected state in the upper portion of the seat bottom 31 in a substantially horizontal state. Then, the front panels 54 are opened right and left in a rear direction to form the expandable side panels expanded in a front direction from the front ends of the stationary side panels 52.

As described above, in this embodiment, it is not necessary to lift and move the screen shield 10. The seat bottom 31 is rotated in a front direction so that the screen shield 10 is moved in a front direction. Thus, the operation of changing the 4 passengers transformation to the 2 passengers transformation can be performed more easily.

When the 2 passengers transformation shown in FIG. 25 is changed to the 4 passengers transformation shown in FIG. 23, the above operation may be reversed. Also in this case, it is not necessary to lift and move the screen shield 10, so that the operation of changing the 2 passengers transformation to the 4 passengers transformation can be performed more easily.

Since the seat bottom 31 is rotated 180° in a front direction about the hinges 41, the screen shield 10 coupled to the seat bottom 31 via the hinges 46 is located in a more front direction by the length in a front-rear direction of the seat bottom 31 than when the seat bottom 31 is rotated 90° in a front direction so as to become in a substantially erected state. As a result, the housing space of the cargo bed 9 can be increased.

The screen shield 10 has the front panels 54 of the cargo bed 9 and the front panels 54 configure the expandable side panels in the 2 passengers transformation. Thus, it is not necessary to additionally provide the expandable side panels, so that the configuration of the cargo bed 9 can be simplified.

The angle at which the seat bottom 31 is rotated in a front direction about the hinges 41 need not be 180°. When the seat bottom 31 is rotated above 90° in a front direction about the hinges 41, the screen shield 10 is located in a more front direction than when the seat bottom 31 is in a substantially erected state. The housing space of the cargo bed 9 can be increased.

The present invention is not limited to the configurations of the above embodiments and includes various modification examples contemplated in the scope without departing from the contents described in the scope of the claims.

What is claimed is:

1. A pick-up style utility vehicle comprising:
    a front seat;
    a rear seat; and
    a cargo bed in this order from a front of the vehicle;
    a cabin frame surrounding a riding space; and
    a screen shield partitioning the cargo bed and a rear riding space in front of the cargo bed, wherein:
    the cargo bed can be changed between an expanded state in which the cargo bed is expanded in a front direction into the rear riding space and a non-expanded state not occupying the rear riding space,
    a backrest for the rear seat is attached to the screen shield, the backrest for the rear seat is placed so as to contact the screen shield in the expanded state and in the non-expanded state, and
    the screen shield can be shifted between a position in the expanded state and a position in the non-expanded state when a seat bottom and the backrest of the rear seat are changed between a retracted state in which the seat bottom and the backrest are erected on the same straight line and a seatable use state, and
    the backrest for the rear seat is placed on the upper side of the seat bottom of the rear seat in the refracted state.

2. The pick-up style utility vehicle according to claim 1, wherein the seat bottom and the backrest are rotatably coupled.

3. The pick-up style utility vehicle according to claim 2, wherein an upper portion of the screen shield is attached to an upper portion of the cabin frame in the expanded state.

4. The pick-up style utility vehicle according to claim 1, wherein the upper portion of the screen shield is attached to the upper portion of the cabin frame, and
    wherein the screen shield can be moved in a front-rear direction in the upper portion of the cabin frame.

5. The pick-up style utility vehicle according to claim 1, wherein a lower portion of the screen shield can be attached to and detached from the seat bottom.

6. The pick-up style utility vehicle according to claim 2, wherein the screen shield has a rail on the front surface thereof, and
    wherein the seat bottom and the backrest are moved on the rail when the cargo bed is changed between the expanded state and the non-expanded state.

7. The pick-up style utility vehicle according to claim 1, further comprising:
    a link mechanism coupling the seat bottom and the backrest, wherein the seat bottom and the backrest can be shifted between the retracted state and the used state by the link mechanism.

8. A pick-up style utility vehicle comprising:
    a front seat;
    a rear seat; and
    a cargo bed in this order from front;
    a cabin frame surrounding a riding space; and
    a screen shield partitioning the cargo bed and a rear riding space in front of the cargo bed, wherein
    the cargo bed can be changed between an expanded state in which the cargo bed is expanded in a front direction to the rear riding space and a non-expanded state not occupying the rear riding space, wherein:
    a seat bottom of the rear seat and the screen shield are rotatably coupled,
    the seat bottom of the rear seat is placed so as to contact the screen shield in the expanded state and in the non-expanded state, and
    the screen shield can be shifted between a position in the expanded state and a position in the non-expanded state when the seat bottom and the screen shield are changed between a refracted state in which the seat bottom and the screen shield are erected on the same straight line and a seatable use state, and
    the screen shield is placed on an upper side of the seat bottom of the rear seat in the refracted state.

9. The pick-up style utility vehicle according to claim 8, wherein:
    the cargo bed has a pair of right and left side panels,
    the side panels are the side panels of the cargo bed in the expanded state and the non-expanded state and are the side panels of the rear seat in the non-expanded state,
    the seat bottom can be rotated via the front ends of the side panels, and
    the seat bottom and the screen shield are rotated via the front ends of the side panels in the expanded state and are held in the retracted state.

10. The pick-up style utility vehicle according to claim 8, wherein:
    the seat bottom is provided so as to be rotatable relative to a bottom plate of the cargo bed,
    the seat bottom is rotated relative to the bottom plate in the expanded state and has a bottom portion configuring an expandable bottom plate formed in a front direction from the front end of the bottom plate,
    the screen shield has a pair of right and left panel members openable and closeable right and left in a rear direction, and
    the panel members configure front panels of the cargo bed in the non-expanded state and configure expandable side panels expanding the side panels of the cargo bed expanded in a front direction from the front ends of the side panels of the cargo bed in the expanded state.

* * * * *